(12) United States Patent
Lee et al.

(10) Patent No.: US 12,231,258 B2
(45) Date of Patent: Feb. 18, 2025

(54) SYSTEM AND METHOD FOR CONTROLLING HOME APPLIANCES

(71) Applicant: LG ELECTRONICS INC., Seoul (KR)

(72) Inventors: Jihye Lee, Seoul (KR); Hyokune Hwang, Seoul (KR); Jung Eun Chol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 18/088,225

(22) Filed: Dec. 23, 2022

(65) Prior Publication Data

US 2023/0216703 A1     Jul. 6, 2023

(30) Foreign Application Priority Data

Jan. 6, 2022   (KR) ........................ 10-2022-0002278

(51) Int. Cl.
  *G06F 17/00*   (2019.01)
  *G06F 1/3234*  (2019.01)
  *H04L 12/28*   (2006.01)

(52) U.S. Cl.
  CPC ........ *H04L 12/2827* (2013.01); *G06F 1/3234* (2013.01); *H04L 2012/285* (2013.01)

(58) Field of Classification Search
  CPC ........... H04L 12/2827; H04L 2012/285; G06F 1/3234
  USPC ........................................................ 709/238
  See application file for complete search history.

(56) References Cited

U.S. PATENT DOCUMENTS

2019/0383865 A1   12/2019   Sim et al.
2021/0167600 A1*   6/2021   Morita ................... G06Q 50/06

FOREIGN PATENT DOCUMENTS

| JP | 2014-130424 | 7/2014 |
| KR | 10-2004-0021814 | 3/2004 |
| KR | 10-2017-0091073 | 8/2017 |
| KR | 10-1801095 | 11/2017 |
| KR | 10-1853880 | 5/2018 |
| KR | 10-2021-0089867 | 7/2021 |

OTHER PUBLICATIONS

International Search Report and Written Opinion dated Feb. 9, 2023 issued in Application No. PCT/KR2022/016862.

* cited by examiner

*Primary Examiner* — Jude Jean Gilles
(74) *Attorney, Agent, or Firm* — KED & ASSOCIATES, LLP (57) ABSTRACT

The present disclosure relates to a system and method for controlling home appliances that operates home appliances using a user terminal and controls the operation of the home appliances arranged in a space in consideration of the amount of power consumed in the space. In the present disclosure, when a first home appliance is operated, the first home appliance is operated only when the total power consumption of the first home appliance and other home appliances that are already operating is less than or equal to a reference value.

20 Claims, 9 Drawing Sheets

SYSTEM AND METHOD FOR CONTROLLING HOME APPLIANCES

CROSS-REFERENCE TO RELATED APPLICATION(S)

The present application claims priority to International Patent Application No. PCT/KR2022/016862, file on Nov. 1, 2022, and Korean Patent Application No. 10-2022-0002278, filed in Korea on Jan. 6, 2022, the disclosures of which are incorporated herein by reference in its entirety.

BACKGROUND

1. Field

The present disclosure relates to a system and method for controlling home appliances, more particularly, a system and method for controlling the operation of home appliances in consideration of the amount of power consumption when using a plurality of home appliances in one space.

2. Background

There is an increasing interest in space styling to arrange various types of home appliances in one space in a desired combination according to individual tastes and needs. With recent increase in single-person households, several home appliances such as a microwave oven, a refrigerator, a coffee maker, an ice maker, and BT speaker are usually used in one space. In this regard, there are products that use various home appliances integrally.

As an example, Korean Patent Publication No. 10-2004-0021814 discloses a complex home appliance in which several home appliances are integrated into one system in a limited area at home. As another example, Korean Patent No. 10-1853880 discloses a stacked platform based home appliance that receives and charges power based on a stacking method without using a power cord for each home appliance, and supplies power to other stacked home appliances.

However, in the prior art, when many home appliances are used simultaneously in one space, the maximum allowable power of the space is exceeded, resulting in a power shutdown problem. Accordingly, in the relevant technical field, when a plurality of home appliances are arranged and used in one space, a technology that controls the operation of home appliances in consideration of power consumption is required.

BRIEF DESCRIPTION OF THE DRAWINGS

Embodiments will be described in detail with reference to the following drawings in which like reference numerals refer to like elements, and wherein.

DETAILED DESCRIPTION

The above-described objects, features, and advantages will be described below in detail with reference to the accompanying drawings, and accordingly, those skilled in the art to which the present disclosure pertains will be able to easily practice the technical spirit of the present disclosure. In describing the present disclosure, when it is determined that a detailed description of a known technique related to the present disclosure may unnecessarily obscure the gist of the present disclosure, the detailed description will be omitted. Hereinafter, embodiments according to the present disclosure will be described in detail with reference to the accompanying drawings. Un the drawings, the same reference numerals are used to indicates the same or similar components.

Although the first, second, etc. are used to describe various components, it is understood that these components are not limited by these terms. These terms are only used to distinguish one component from other components, and unless otherwise stated, it is understood that the first component may also be the second component.

Figure 1:
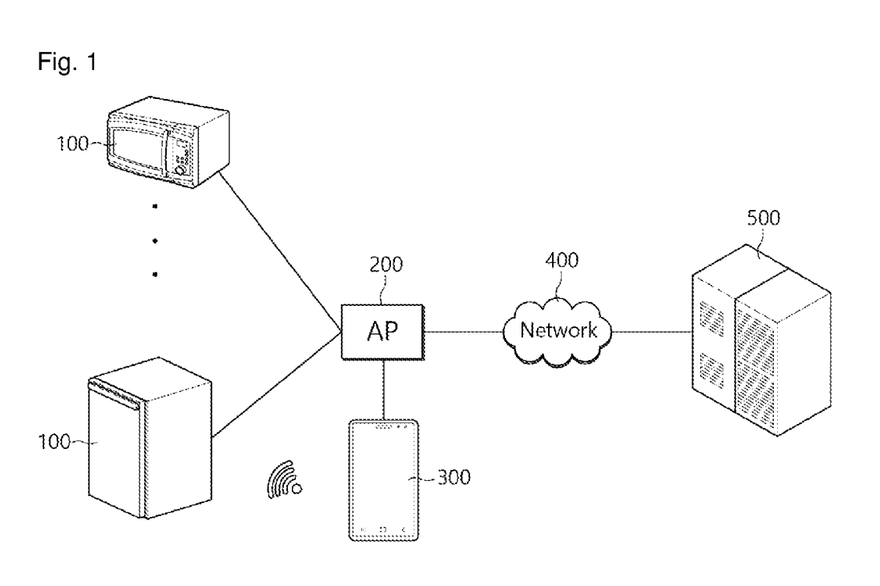
FIG. 1 is a schematic configuration diagram of a system for controlling home appliances according to an embodiment of the present disclosure.

FIG. 1 is a block diagram of a system for controlling home appliances according to an embodiment of the present disclosure. Referring to FIG. 1, the system for controlling home appliances according to the embodiment of the present disclosure includes a plurality of home appliances 100, an AP device 200, a user terminal 300, a network 400, and a server 500.

The home appliance 100 is a home appliance generally used in a home, and may be, for example, a refrigerator, a coffee maker, a microwave oven, an air purifier, and the like. In the present embodiment, the home appliance 100 is at least two or more, all of which are arranged in one space. For example, some home appliances 100 may be stacked.

The home appliance 100 includes a communication module and may communicate with the user terminal 300 and the server 500. The home appliance 100 may communicate directly with the user terminal 300, or may communicate with user terminal 300 and server (or computer) 500 by connecting to the network 400 through the access point device (AP) 200.

The user terminal 300 is a device having a communication function and may communicate with the home appliance 100 and the server 500. The user terminal 300 may communicate with the server 500 through the network 400, such as LTE or 5G.

The user terminal 300 may communicate with the home appliance 100 through the AP device 200 by using, for example, Wi-Fi communication, and may communicate with the home appliance 100 through the server 500 by using the network 400. The user terminal 300 may directly communicate with the home appliance 100 by using, for example, Bluetooth communication.

The user terminal 300 may be installed with a program or a dedicated application (hereinafter, referred to as a dedicated app) for operating and controlling the home appliance 100. The user terminal 300 may execute the dedicated app to transmit a control command for an operation to the home appliance 100 and receive data from the home appliance 100. In this embodiment, the user terminal 300 may be an electronic device such as a smartphone, a tablet, a PDA, a computer, a laptop, or a wearable device such as a smart watch.

The user terminal 300 may register the home appliance 100 in the server 500 by transmitting unique information of the home appliance 100 to the server 500. In this embodiment, the user terminal 300 may receive and display a web page or an application screen including information on the home appliance 100 from the server 500.

The server 500 may communicate with the home appliance 100 and the user terminal 300 to receive and store information, and may return information requested from the user terminal 300. The server 500 may receive a control command for the operation of the home appliance 100 requested from the user terminal 300 and control the operation of the home appliance 100 according to the control command. The server 500 may store information of the home appliance 100 registered by the user terminal 300 in the database DB, and receive data transmitted in real time from the home appliance 100 to update the information of the home appliance 100 in real time.

Server 500 may be implemented as a single device, or may be implemented as a distributed processing system in which a plurality of server devices are interconnected to distribute the requested data in a plurality of server devices. The server 500 may be a cloud service-based server system or a web server. Accordingly, a web page screen data related to the home appliance 100 may be provided to the user terminal 300.

The server 500 may store firmware information and operation information of the home appliance 100, and may register product information of the home appliance 100. For example, the server 500 may be a server operated by a manufacturer of the home appliance 100, or may be a server operated by an open application store operator or a service provider providing services related to the home appliance 100.

Figure 2:
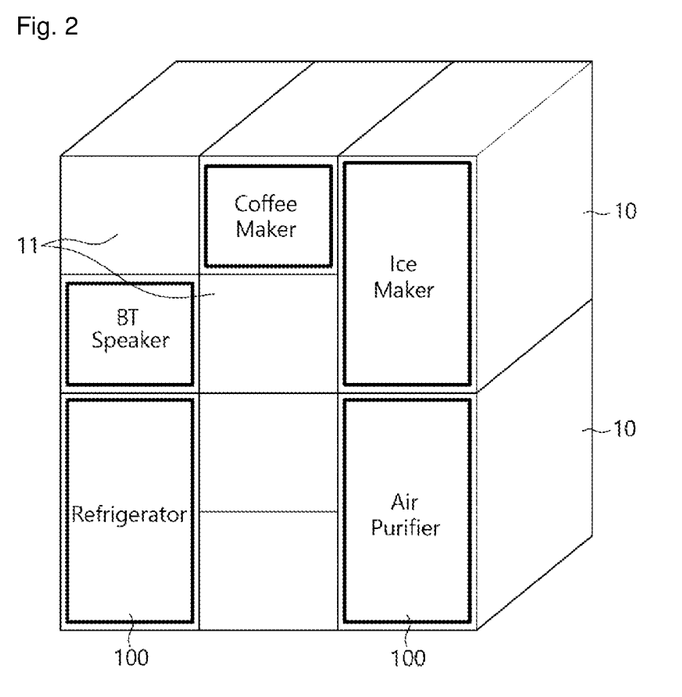
FIG. 2 is an exemplary view in which home appliances according to the embodiment of the present disclosure are arranged in one space.

FIG. 2 is an exemplary view in which home appliances according to the embodiment of the present disclosure are arranged in one space. When many home appliances 100 are used in one space as shown in FIG. 2, the home appliances 100 may be inserted and arranged according to the shape of each space 11 using frames 10 divided into a plurality of spaces 11 in order to efficiently use the space.

The frame 10 is composed of a plurality and may be separated and combined to each other. Accordingly, each frame 10 may be disposed at a different position according to a position of the home appliances 100 to be arranged.

When the home appliances 100 arranged in one space are operating, the maximum allowable power of the space may be exceeded. Therefore, when some or all of the home appliances 100 are used simultaneously, it is necessary to consider the maximum allowable power of the space.

Figure 3:
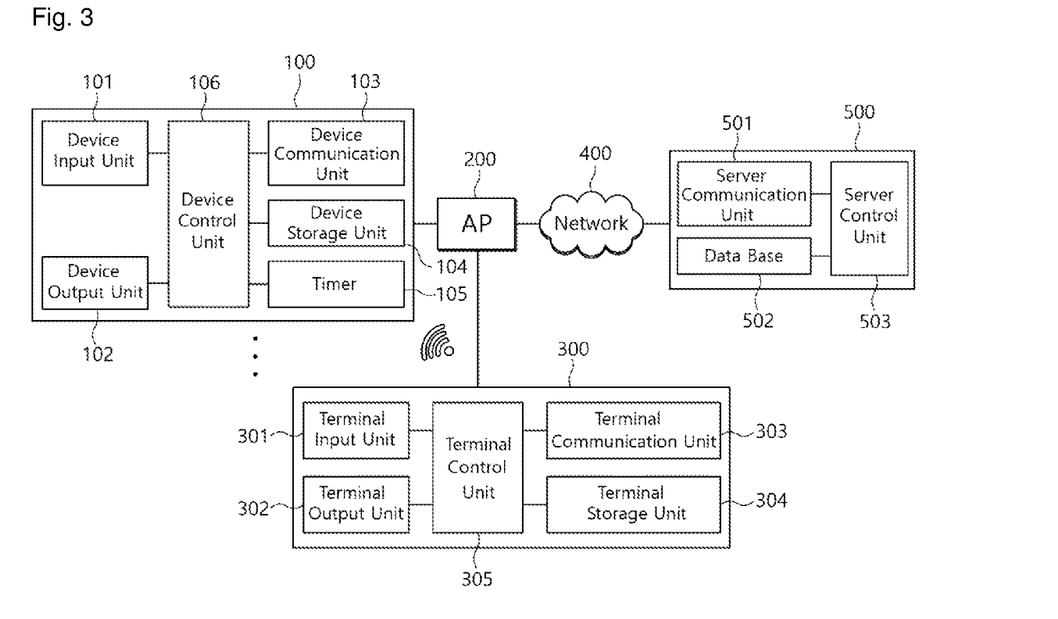
FIG. 3 is a block diagram of the configuration of the system for controlling home appliances according to the embodiment of the present disclosure.

FIG. 3 is a block diagram of the system for controlling home appliances according to the embodiment of the present disclosure. Referring to FIG. 3, the home appliance 100 constituting the system for controlling home appliances of the present disclosure includes a device input unit (or input device) 101, a device output unit (or output device) 102, a device communication unit (or communication interface) 103, a device storage unit 104, a timer 105, and a device control unit (or controller) 106.

The device input unit 101 receives a user's manipulation input. The user may register the home appliance 100 in the server 500 by inputting information on the home appliance 100 through the device input unit 101.

The device output unit 102 may display information, operation information, and state information of the home appliance 100, and the like. The user may check the operating state and the current state of the home appliance 100 through the information displayed on the device output unit 102.

The device communication unit 103 may communicate with the server 500 and the user terminal 300 through the AP device 200. The device communication unit 103 may directly communicate with the user terminal 300.

The device communication unit 103 includes, for example, one or more of a Bluetooth communication module, a Wi-Fi communication module, a Zigbee communication module, and an NFC communication module.

The device storage unit 104 includes unique information of the home appliance 100 and data and programs necessary for operation. The device storage unit 104 stores information on the average power consumption of the home appliance 100 and the maximum power consumption for each of a plurality of functions.

The maximum power consumption refers to a value at which the amount of power consumption in a specific function is the maximum while various functions may be executed when the home appliance 100 is operated. For example, when an air purifier is turned on and operated, the amount of power consumed in stage 1 and stage 4 of the air cleaning mode may be different. The amount of power consumed in stage 4 may be greater than in stage 1. The power consumption in the maximum strong wind area may be the maximum. The maximum power consumption may be different for each function.

The timer 105 may count the elapsed time under the control of the device control unit 106. The counted time may be transmitted to the device control unit 106.

The device control unit 106 controls the overall operation of the home appliance 100. The device control unit 106 may register the home appliance 100 in the server 500 by registering the information of the home appliance 100 stored in the device storage unit 103 to the server 500 according to the user's manipulation input.

When a control command for the operation of the home appliance 100 is received from the user terminal 300 and the server 500, the device control unit 106 controls the operation of the home appliance 100. The device control unit 106 may operate the home appliance 100 according to preset operating conditions, including turning on/off the home appliance 100. For example, in the case of an air purifier, the device control unit 106 may turn on the air purifier and operate it in a preset air cleaning mode stage 1.

The control command for the operation of the home appliance 100 may be set to proceed with one step, or may be set to proceed with several steps continuously. For example, when a control command to turn on the air purifier is received, the device control unit 106 may turn on the air purifier to control the air purifier to operate in a preset mode. As another example, when a control command is received to turn on the air purifier at 10 a.m. to operate in the stage 3 of the air cleaning mode, change to the stage 1 after 30 minutes to operate, and turn it off after 1 hour, the device control unit 106 may control the above steps to proceed by using the timer 105.

The device control unit 106 transmits operation information according to the operation of the home appliance 100 to the server 500. The operation information may include various types of information on operations and state of the home appliance 100, such as the location of the home appliance 100, whether it is on/off, an operation time, and an operation mode.

The user terminal 300 constituting the embodiment of the system for controlling home appliances of the present disclosure includes a terminal input unit 301, a terminal output unit 302, a terminal communication unit 303, a terminal storage unit 304, and a terminal control unit (or processor) 305. The terminal input unit 301 receives the user manipulation. The user may input a control command for the operation of the home appliance 100 through the terminal input unit 301.

The terminal output unit 302 may display state information and a control process of the home appliance 100 on a screen. Such state information may include a location, an on/off state, an operation time, an operation mode, and the like of the home appliance 100.

In this embodiment, the terminal input unit 301 and the terminal output unit 302 may be implemented as an integral or one module. When the output unit 302 and a touch sensor for sensing a touch operation form a layer structure to form a touch screen, the output unit 302 may also be used as the input unit 301. The touch sensor may have the form of a touch film, a touch sheet, a touch pad, or the like.

The terminal communication unit 303 communicates with the home appliance 100 and the server 500. For example, direct communication with the home appliance 100 may be performed through Wi-Fi Direct, communication with the home appliance 100 and the server 500 may be performed through the AP 200 and the network 400, and communication with the server 500 may be performed directly through the network 400 without connection of the AP 200.

The terminal storage unit 304 may store a dedicated application program and may store information on the user terminal 300 and the home appliance 100. The terminal control unit 305 controls the overall operation of the user terminal 300. The terminal control unit 305 may execute the dedicated app stored in the storage unit 304 according to a user manipulation input to the input unit 301.

The terminal control unit 305 may register the home appliance 100 in the server 500 by registering the information of the home appliance 100 through the terminal input unit 301 according to user manipulation. The information of the home appliance 100 may include information such as the location of the home appliance 100, product information, average power consumption, and maximum power consumption.

The terminal control unit 305 may transmit control commands and operation information for the operation of the home appliance 100 to the home appliance 100 and the server 500 by using the dedicated app, and display information received from the home appliance 100 and the server 500 on the output unit 302. For example, the terminal control unit 305 may transmit the location, on/off, operation mode, operation time, etc. of the home appliance 100 to the server 500 and/or the home appliance 100. The terminal control unit 305 may transmit a control command to automatically perform the operation mode of each step from ON to OFF of the home appliance 100.

The terminal control unit 305 may control to display a web page or application screen including information of the home appliance 100 on the output unit 302 according to the user manipulation input. For example, the terminal control unit 305 may control to display a web page or an application screen including the location, operation state, and operation information of the home appliance 100 on the output unit 302.

In addition, the terminal control unit 305 may output the image of the home appliance 100 on the screen of the terminal output unit 302 at the same location where the plurality of home appliances 100 are actually arranged by the user's manipulation input. This is to ensure that the actual arrangement of the home appliance 100 and the arrangement of the image of the home appliance 100 in the terminal output unit 302 are the same.

The server 500 constituting the embodiment of the system for controlling home appliances of the present disclosure is configured to include a server communication unit 501, a database (DB) 502, and a server control unit 503. The server communication unit 501 may communicate with the home appliance 100 and the user terminal 300 through the network 400. The server communication unit 501 may receive a control command for the operation of the home appliance 100 from the user terminal 300 and the server 500 and transmit the control command to the home appliance 100.

The database (DB) 502 may store various types of information about the server 500, the home appliance 100, and the user terminal 300. The DB 502 may store mapping information between the user terminal 300 and the home appliance 100. This is to map and store the identification information of the user terminal 300 and the home appliance 100, so that the home appliance 100 to be controlled and managed by the user terminal 300 is mapped to each other.

DB 502 also stores Information about the home appliance 100 and the user terminal 300. The information of the home appliance 100 includes information such as unique information of the home appliance 100, placement location, product information, operation information, state information, average power consumption, maximum power consumption, and maximum allowable power in a specific space.

In this case, a specific space may be specified by the user terminal 300, and the user may designate the specific space through the user terminal 300 and register it in the server 500. In addition, the maximum allowable power information set in the specific space may also be registered in the server 500. The server control unit 503 may control the overall operation of the server 500.

The server control unit 503 may perform authentication according to a request for authentication of the user terminal 300 and the home appliance 100, map the user terminal 300 and the home appliance 100 using identification information of the user terminal 300 and the home appliance 100, and store them in the DB 502. The server control unit 503 may store various types of information transmitted from the home appliance 100 through the network 400 in the DB 502.

The server control unit 503 may receive a control command for the operation of the home appliance 100 from the user terminal 300 and transmit the control command to the home appliance 100, or control the operation of the home appliance 100 according to the control command. At this time, when a control command for the operation of the home appliance 100 is received from the user terminal 300, the server control unit 503 may operate the home appliance 100 according to the control command based on the information of the home appliance 100 stored in the DB 502.

For example, when a control command to turn on the home appliance 100 is received from the user terminal 300, the server control unit 503 may determine whether to turn on/off the home appliance 100 by comparing the average or maximum power consumption of the home appliance 100 with the maximum allowable power preset in the space. The server control unit 503 may return information of the home appliance 100 to the user terminal 300 according to a request from the user terminal 300. For example, information such as the location of the home appliance 100, whether on/off, an operation state, and operation information may be returned.

Figure 4:
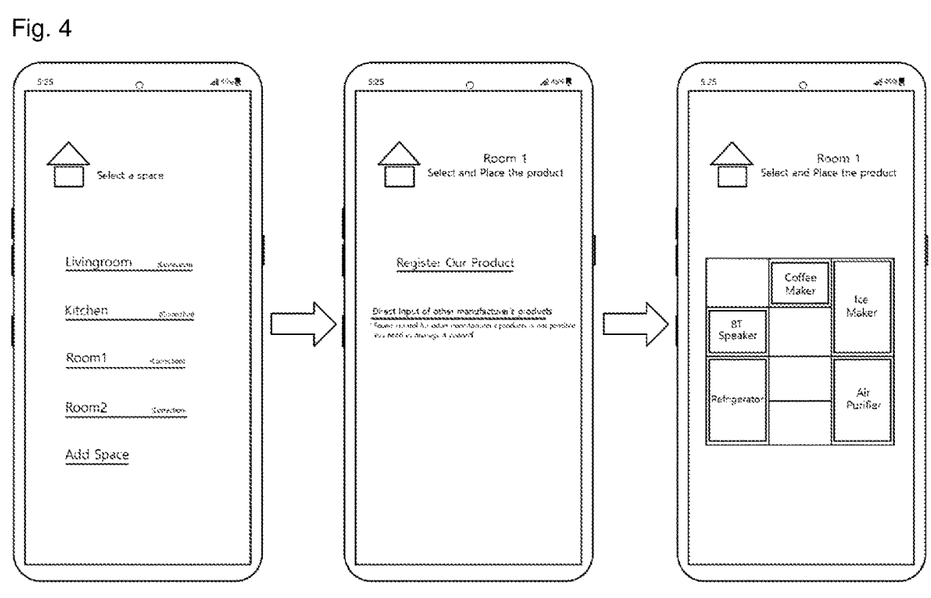
FIG. 4 is an exemplary screen view of a user terminal showing an example of registering an arrangement of a plurality of home appliances in the system for controlling home appliances according to the embodiment of the present disclosure.

FIG. 4 is an exemplary screen view of the user terminal showing an example of registering the arrangement of a plurality of home appliances in the system for controlling home appliances according to the embodiment of the present disclosure. The user may access the server 500 by logging in after registering as a member by executing a dedicated app on the user terminal 300.

The user first selects a space in which the home appliance 100 is to be located, and arranges the home appliance 100 in the selected space. That is, the home appliance 100 is virtually placed on the dedicated app in the same location where the home appliance 100 is actually placed.

In the user terminal 300, the screen on which the image of the home appliance 100 is arranged is displayed on the terminal output unit 302 so as to be identical to the location where the home appliance 100 is actually placed. Accordingly, the actual arrangement location of the home appliance 100 and the virtual arrangement location may be synchronized. The virtual arrangement location is registered in the server 500.

The registered virtual arrangement location may be changed. It is possible to additionally register, delete, and change the location of the home appliance in the virtual arrangement location. The location of the home appliance may be moved by touching the home appliance to be moved and dragging it to the position to be moved. When the arrangement of the home appliance 100 on the dedicated app is completed, the information of the home appliance 100 is registered in the server 500.

Figure 5:
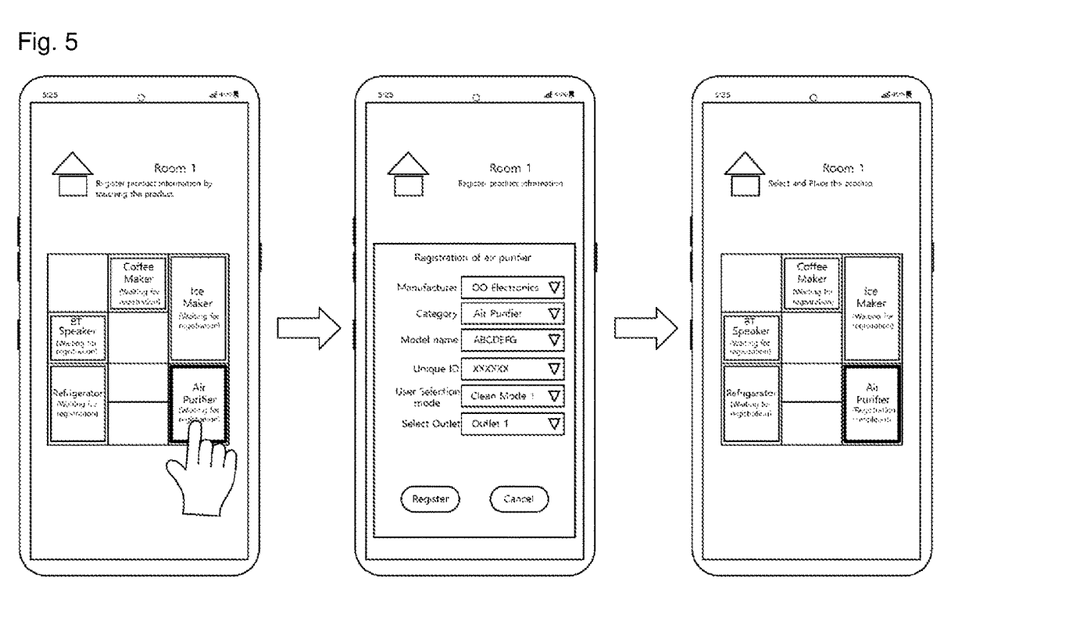
FIG. 5 is an exemplary screen view of the user terminal showing an example of registering a plurality of home appliances in a server in the system for controlling home appliances according to the embodiment of the present disclosure.

FIG. 5 is an exemplary screen view of the user terminal showing an example of registering a plurality of home appliances in the server in the system for controlling home appliances according to the embodiment of the present disclosure. In a state where the arrangement of the home appliance 100 is completed, the information of the home appliance 100 may be registered in the server 500 by touching the image of the home appliance 100 on the displayed screen. In an example of FIG. 5, an example of registering information of an air purifier is illustrated.

When the air purifier is touched, the screen for registering information of the air purifier is changed and displayed. For example, information such as a manufacturer, a category, a model name, a unique ID, a user's selection operation, and a use outlet may be selected or input on the screen. Here, the user's selection operation is to set the operation mode in advance when the corresponding home appliance 100 is operated, and the use outlet is to input which outlet is used among the outlets provided in the space.

When the product registration of the home appliance 100 is completed, it is displayed on the screen that the registration is completed. Another home appliance 100 waiting for registration may be registered in the same way. When the registration of information of the home appliance 100 is completed, the user may operate the home appliance 100 registered through the user terminal 300.

Figure 6:
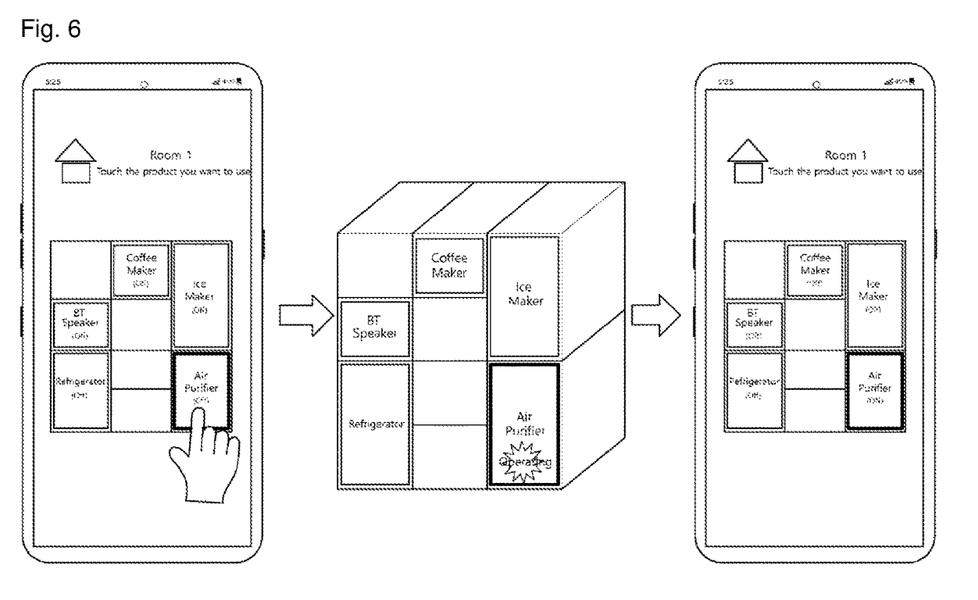
FIG. 6 is an exemplary screen view of the user terminal showing an example of operating a plurality of home appliances in the system for controlling home appliances according to the embodiment of the present disclosure.

FIG. 6 is an exemplary screen view of the user terminal showing an example of operating a plurality of home appliances in the system for controlling home appliances according to the embodiment of the present disclosure. Referring to FIG. 6, when the user executes the dedicated app on the user terminal 300 and touches an image of the home appliance 100 on the screen, the corresponding home appliance 100 is actually operated. That is, when the image of the home appliance 100 is touched, the user terminal 300 transmits a control command for the operation of the home appliance 100 to the server 500, the server 500 transmits the control command to the home appliance 100, and the home appliance 100 operates according to the received control command.

The drawing shows an example of turning on the air purifier as an example. When the user touches the air purifier displayed on the user terminal 300, a control command to turn on the air purifier is transmitted to the air purifier through the server 500 to turn on the air purifier. When the actual home appliance 100 is operated, it is displayed on the screen of the user terminal 300 that the corresponding home appliance is in operation.

Figure 7:
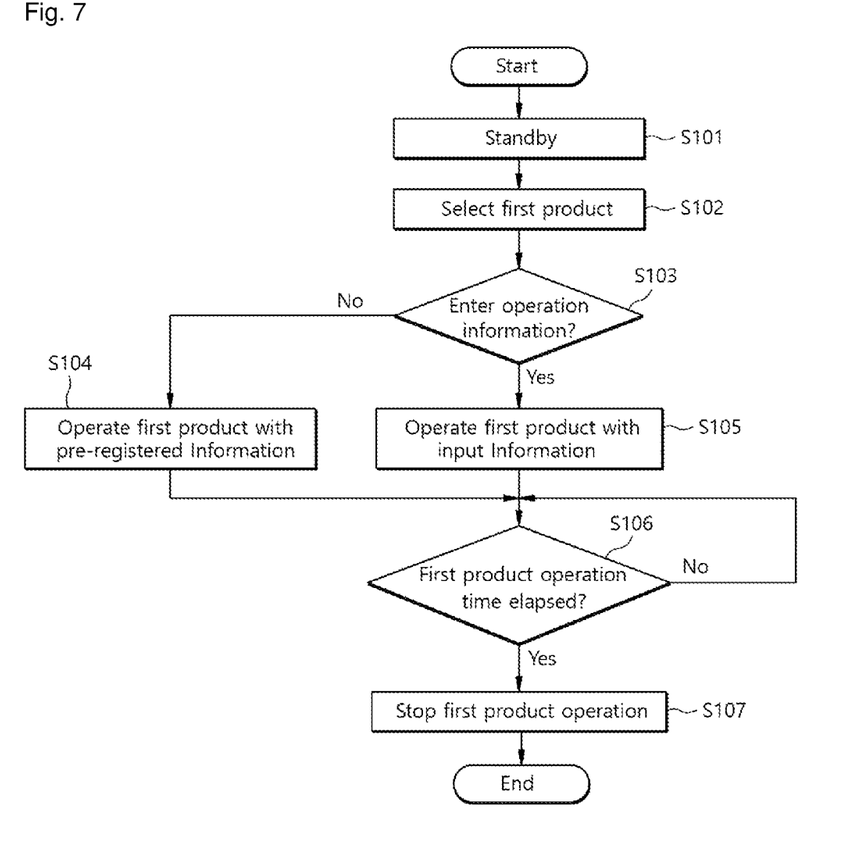
FIG. 7 is a flowchart illustrating a method for controlling home appliances according to an embodiment of the present disclosure.

FIG. 7 is a flowchart illustrating a method for controlling home appliances according to an embodiment of the present disclosure. Referring to FIG. 7, in the method for controlling home appliance of the present disclosure, the standby state of step S101 is a state in which the user logs in after signing up for a membership, places the home appliance 100 in the dedicated app to match the actual location of the plurality of home appliances 100, and completes registration of information of the home appliance 100 in the server 500.

A first product is selected among the home appliances 100 in the user terminal 300 at S102, and it is checked whether operation information of the first product is input at S103. If the operation information is not input, the user terminal 300 transmits a control command for the operation of the first product to the server 500 to operate with the previously registered information, and the server 500 operates the first product with the previously registered information at S104.

When operation information is input, the user terminal 300 transmits a control command for the operation of the first product to the server 500 to operate with the input information, and the server 500 operates the first product according to the input information at S105. When the operation time of the first product elapses at S106, the server 500 stops the operation of the first product at S107.

As described above, in the present disclosure, the user may remotely operate the actual home appliance 100 by executing the dedicated app on the user terminal 300 and touching the home appliance selected from the plurality of home appliances 100. At this time, even if the user touches the home appliance on the screen of the user terminal 300, the home appliance is actually operated only if a specific condition is satisfied.

That is, when the user touches a specific home appliance, the server 500 determines whether to operate the specific home appliance in consideration of the amount of power required to operate the touched home appliance. This operation will be described in more detail with reference to FIGS. 8 and 9.

Figure 8:
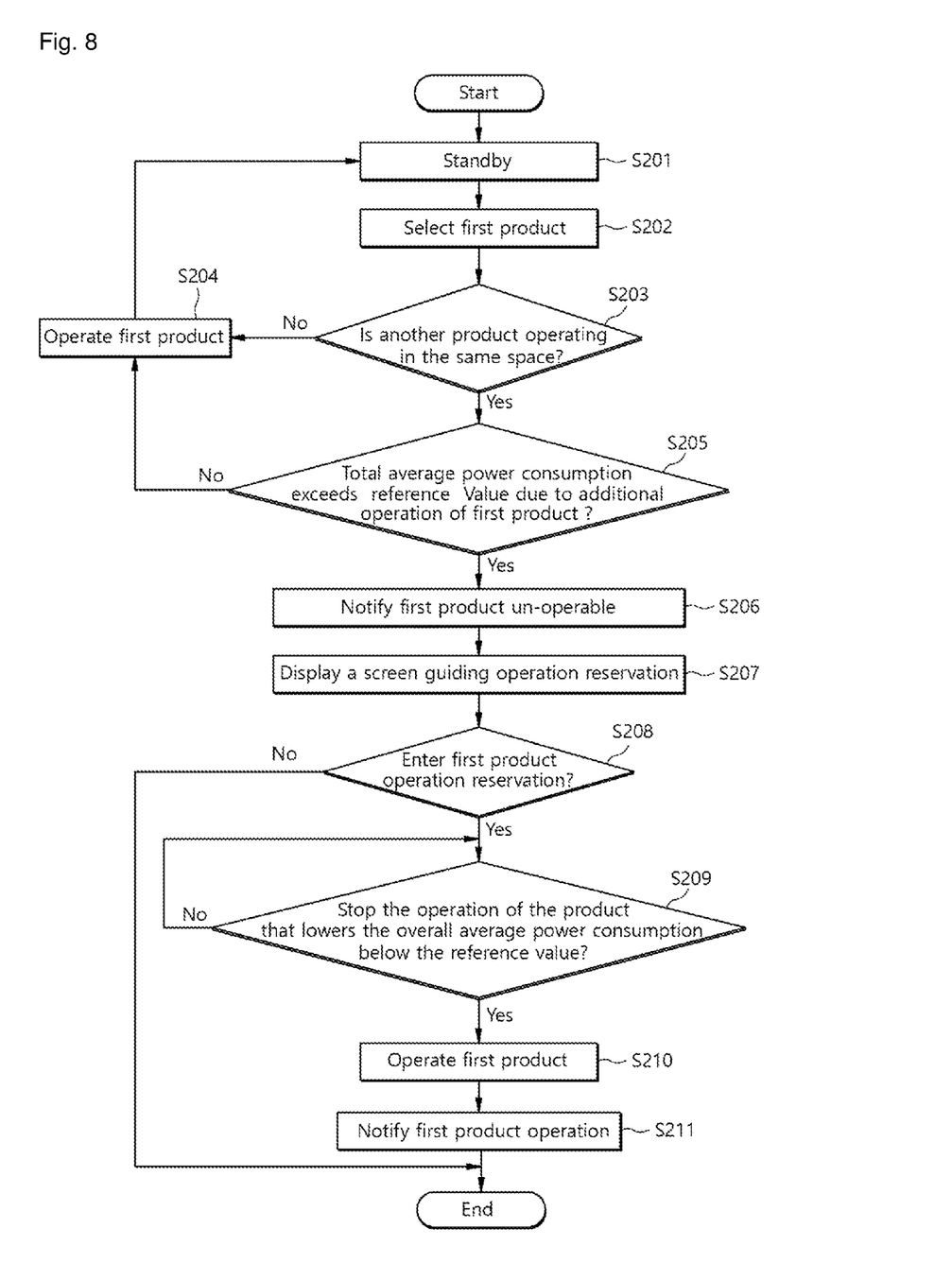
FIG. 8 is a flowchart illustrating the method for controlling home appliances according to another embodiment of the present disclosure.

FIG. 8 is a flowchart of the method for controlling home appliances according to another embodiment of the present disclosure. Referring to FIG. 8, in a standby state where the home appliance 100 is registered in the server 500 at S201, when a first product of the home appliance 100 is selected in the user terminal 300 at S202, the user terminal 300 transmits a control command for the operation of the first product to the server 500, and the server 500 determines whether another product is already operating in the same space as the first product at S203.

If another product is not in operation, the server 500 operates the first product according to the control command at S204. However, if the other product is already in operation, the server 500 determines whether the total average power consumption in the space exceeds a reference value (maximum allowable power in the set space) when the first product is operated at S205. Here, the total average power consumption in the space is the sum of the average power consumption for each product operating in the space.

If the total average power consumption in the same space exceeds the reference value during operation of the first product, the server 500 outputs a notification of non-operation of the first product to the user terminal 300 and the first product. The user terminal 300 and the first product output the notification of non-operation to the outside to notify the user at S206. This is to prevent power shutdown problems from exceeding the maximum allowable power in the space when the first product operates while other products are operating.

For example, three products A, B, and C are placed in one space and the maximum allowable power of space is 3300 W. The average power consumption of product A, B, and C is 1500 W, 500 W, and 2000 W, respectively. In this case, when product A is touched on the screen of the user terminal 300, the server 500 checks the average power consumption of A product (1.5 kW) and operates product A because it is equal to or less than the preset maximum allowable power (3.3 kW).

After that, when product B is touched while product A is operating, the server 500 confirms that the total average power consumption (1.5+0.5=2.0 kW) expected when products A and B operate at the same time is equal to or less than the maximum allowable power (3.3 kW), and also operates product B. However, if product C is touched while products A and B are operating, the server 500 checks that the expected total average power consumption (1.5+0.5+ 2.0=4.0 kW) during the operation of products A, B, and C exceeds the maximum allowable power, and does not operate product C.

In this case, in FIG. 8, the first product may be reserved to operate when a specific condition is met. Specifically, an operation reservation of the first product is input in the user terminal 300 by the user at S208. When there are other products currently in operation and the first product is additionally reserved to operate, the server 500 operates the first product at S210 when a product that makes the total average power consumption expected in the space below the reference value is stopped at S209. When the first product is operated, the server 500 transmits a notification of the operation to the user terminal 300 and the first product, and the user terminal 300 and the first product output the notification to the outside so that the user is notified at S211.

In the above example, even if product C is touched while products A and B are operating, product C does not operate because the expected total average power consumption exceeds the maximum allowable power. However, when at least one of products A and B is stopped, it is reserved to operate product C. Even in this case, the operation of product C is determined by comparing the total average power consumption at the time of operation of product C with the maximum allowable power.

For example, if product B is stopped while products A and B are operating, and product C is subsequently operated, the total average power consumption of products A and C becomes 3.5 kW (=1.5 kW+2.0 kW) and exceeds the maximum allowable power (3.3 kW), so product C may not be operated. However, if product A is stopped while products A and B are operating, and product C is subsequently operated, the total average power consumption of products B and C becomes 2.5 kW (=0.5 kW+2.0 kW), which is equal to or less than the maximum allowable power, so product C may be operated.

Figure 9:
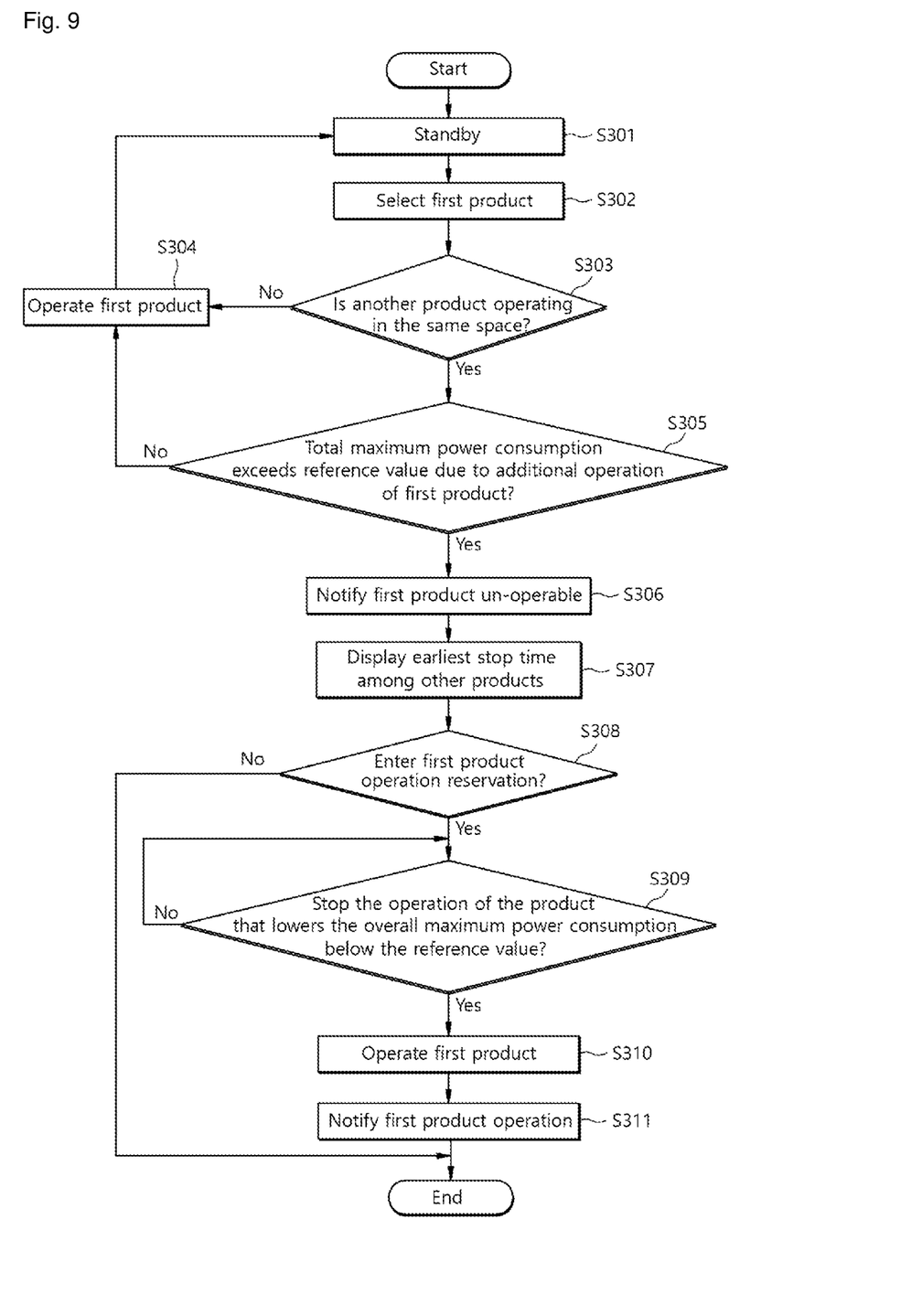
FIG. 9 is a flowchart illustrating the method for controlling home appliances according to another embodiment of the present disclosure.

FIG. 9 is a flowchart illustrating the method for controlling home appliances according to another embodiment of the present disclosure. Referring to FIG. 9, when a first product is selected from a plurality of home appliances 100 in a standby state at S301, the user terminal 300 transmits a control command for the operation of the first product to the server 500, and the server 500 determines whether another product is already operating in the same space as the first product at S303.

If another product is not operating in the same space, the server 500 operates the first product according to the control command at S304. However, if another product is already operating in the same space, the server 500 determines whether the expected total maximum power consumption in the space exceeds the reference value (maximum allowable power) when the first product is operated at S305.

If the total maximum power consumption in the same space exceeds the reference value during operation of the first product, the server 500 outputs a notification of non-operation of the first product to the user terminal 300 and the first product. The user terminal 300 and the first product output a notification of non-operation to the outside to notify the user at S306. This is to prevent power shutdown problems from occurring when the first product operates while another product is operating and the total maximum power consumption exceeds the maximum allowable power in the space.

For example, in the above example, product B has an average power consumption of 500 W, but it is assumed that the maximum power consumption is temporarily 800 W when operating a specific function, and product C has an average power consumption of 2000 W, but the maximum power consumption is temporarily 2600 W when operating a specific function. At this time, if product C wants to operate while product B is operating, the average power consumption of products B and C are 2.5 kW (0.5 kW+2.0 kW), which is less than the maximum allowable power (3.3 kW). However, when operating a specific function, the maximum power consumption of products B and C is 3.4 kW (=0.8 kW+2.6 kW) temporarily, so the maximum allowable power (3.3 kW) is exceeded, and product C may not be operated.

When the operation of the first product is not possible, the server 500 may selectively transmit the time of the product that is stopped earliest among other products in operation to the user terminal 300 and the first product, and the user terminal 500 and the first product may display it at S307. The operation time is predetermined for each product, and may be automatically stopped when the operation time elapses. In this case, the first product may be reserved to operate when a specific condition is met.

Specifically, an operation reservation of the first product is input in the user terminal 300 by the user at S308. When there are other products currently in operation and the first product is additionally reserved to operate, the server 500 operates the first product at S310 when a product that makes the maximum power consumption expected in the space equal to or below the reference value is stopped at S309. Then, the server 500 transmits a notification of the operation to the user terminal 300 and the first product, and the user terminal 300 and the first product output the notification to the outside so that the user is notified at S311.

As another example, assuming that product A's average power consumption is 1500 W, maximum power consumption is 1600 W, product B's average power consumption is 500 W, maximum power consumption is 700 W, product C's average power consumption is 2000 W, and maximum power consumption is 2200 W, when product B is stopped while products A and B are operating and product C reserved for operation is operating, the maximum power consumption of products A and C is 3.8 kW(=1.6 kW+2.2 kW), exceeding the maximum allowable power, so product C may not be operated. However, if product A is stopped while products A and B are operating, and even if product C is operated, the maximum power consumption of product B and C becomes 2.9 kW (=0.7 kW+2.2 kW), which is equal to or less than the maximum allowable power consumption, so product C may be operated.

As shown in FIGS. 8 and 9, in the method for controlling home appliances of the present disclosure, when operating home appliances arranged in one space, the average power consumption and the maximum power consumption of the home appliance are compared with a preset maximum allowable power consumption to determine whether to operate. At this time, if some of the home appliances in operation are stopped and afterwards another home appliance is operated, the average power consumption and maximum power consumption of the home appliance to be operated is compared with the preset maximum allowable power consumption to determine whether the home appliance operates or not. Accordingly, it is possible to solve the power shutdown concern in advance due to the operation of home appliances arranged in one space.

The present disclosure provides a system and method for controlling home appliances that controls the operation of home appliances in consideration of the amount of power used in the space when a plurality of home appliances are used in one space. The present disclosure provides a system and method for controlling home appliances that controls the operation of a plurality of home appliances in consideration of the maximum allowable power in one space.

In a system and method for controlling home appliances according to an embodiment of the present disclosure, an operation of a plurality of home appliances is controlled using a user terminal. When a control command for the operation of the home appliance is input to the user terminal according to the user's manipulation input, the user terminal transmits the control command to a server, and the server controls the operation of the home appliance according to the control command.

A plurality of home appliances may be arranged in one space, and may perform communication with the user terminal and the server. The user terminal also communicates with the home appliances and the server. The user terminal registers information of the plurality of home appliances in the server. When the operation of a first home appliance among the plurality of home appliances is requested according to the user's manipulation input, the user terminal transmits the control command for the operation of the first home appliance to the server.

When the control command is received, the server checks whether a home appliance other than the first home appliance is in operation. If another home appliance is operating, the server determines whether the total power consumption expected in the space exceeds a preset reference value when the first home appliance is additionally operated. The server operates the first home appliance only if the reference value is not exceeded.

If the expected total power consumption exceeds the reference value, the first home appliance is not operated. Accordingly, power shutdown may be prevented by preventing the total power consumption from exceeding the reference value during the additional operation of the first home appliance. In this case, when the first home appliance is not operated, a notification is output from the first home appliance and the user terminal to inform the user of this situation.

In addition, when the first home appliance is not operated, an operation reservation may be input so that the first home appliance may be operated under a specific condition. When the operation reservation of the first home appliance is input, it is determined whether at least one of the other appliances already in operation stops operating, and whether the expected total power consumption in the space exceeds the reference value when the first appliance is additionally operated. The first home appliance is operated only if it does not exceed the reference value. This is also to prevent the total power consumption from exceeding the reference value by additional operation the first home appliance even if one of the other home appliances already in operation stops operating.

In this case, the above total power consumption may be the total average power consumption of other home appliances and the first home appliance operating in the space, or the total maximum power consumption of other home appliances and the first home appliance operating in the space. The user terminal may display the images of the home appliances on the screen in the same position as the position where a plurality of home appliances arranged in one space are actually arranged. And, when the image of the home appliance is touched according to the user's manipulation input, the user terminal transmits the control command for the operation of the home appliance to the server, and the server may operate the home appliance according to the control command.

According to the present disclosure, it is possible to prevent power shutdown that may occur when several home appliances are used in one space. According to the present disclosure, since the operation of home appliances is controlled in consideration of the amount of power consumed during the operation of the home appliances, power consumption may be reduced. The present disclosure controls the operation of the home appliances according to the maximum allowable power in the space, thereby enabling safe use of home appliances.

The aspects of the present disclosure are not limited to the above-described objects, and other aspects not mentioned may be understood by the foregoing description, and will be more clearly understood by the embodiments of the present disclosure. In addition, it will be easily seen that the aspects of the present disclosure may be realized by the means described in the claims and combinations thereof.

Embodiments of the present disclosure are described with reference to the accompanying drawings. The disclosure may, however, be embodied in many different manners and should not be construed as limited to the embodiments set forth herein. It is understood that a person having ordinary skill in the art to which the present disclosure are would implement this disclosure in other specific manners without changing the technical idea or necessary features of the present disclosure. For this reason, the disclosed embodiments are intended to be illustrate in all aspects, and not restrictive.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a plurality of home appliances, the method comprising:
    receiving, by a processor, a request to operate a first home appliance among the plurality of home appliances;
    determining, by the processor and based on receiving the request to operate the first home appliance, that one or more second home appliances among the plurality home appliances are operating;
    determining, by the processor, whether a total power consumption expected during concurrent operation of the first home appliance and the one or more second home appliances exceeds a preset reference value; and
    operating, by the processor, the first home appliance concurrently with the one or more second home appliances when the total power consumption during operation of the first home appliance and the one or more second home appliances does not exceed the preset reference value.

2. The method of claim 1, further comprising:
    when the total power consumption exceeds the reference value, not operating the first home appliance while operating of the one or more second home appliances.

3. The method of claim 2, further comprising:
    outputting, when the first home appliance is not operated, a notification from at least one of the first home appliance or a user terminal.

4. The method of claim 2, wherein when the first home appliance is not operated, the method further comprises:
    inputting an operation reservation of the first home appliance;
    stopping operation of at least one of the one or more second home appliances;
    determining whether a modified total power consumption expected during operation of the first home appliance and operating ones of the one or more second home appliances exceeds the reference value; and
    operating the first home appliance when the modified total power consumption does not exceed the reference value.

5. The method of claim 4, wherein stopping the operation of the at least one of the one or more second home appliances includes:
- determining respective operation times for the at least one of the second home appliances; and
- automatically stopping the at least one of the second home appliances when the operation times elapse.

6. The method according to claim 1, wherein the total power consumption is a total average power consumption of the first and second home appliances in operation.

7. The method according to claim 1, wherein the total power consumption is the total maximum power consumption of the first and second home appliances in operation.

8. A system comprising:
- a plurality of home appliances;
- a user terminal configured to transmit a control command for operation of a first home appliance of the plurality of home appliances; and
- a computer configured to receive the control command from the user terminal and to control the operation of the first home appliance according to the control command,
- wherein when the control command for the operation of the first home appliance is received, the computer determines whether one or more second home appliances of the plurality of home appliances are operating, and operates the first home appliance if a total power consumption expected during a concurrent operation of the first home appliance and the one or more second home appliances does not exceed a preset reference value.

9. The system of claim 8, wherein the computer operates the first home appliance when the one or more second home appliances are not in operation.

10. The system of claim 8, wherein the computer does not operate the first home appliance when the total power consumption expected during the operation of the first home appliance and the one or more second home appliances exceeds the reference value.

11. The system of claim 10, wherein the computer operates the first home appliance when an operation reservation of the first home appliance is received, at least one of the one or more second home appliances in operation stops operating, and a modified total power consumption during operation of the first home appliance and operating ones of the one or more second home appliances does not exceed the reference value.

12. The system of claim 11, wherein the computer, based on the computer not operating the first home appliance when the total power consumption expected during the operation of the first home appliance and the one or more second home appliances exceeds the reference value:
- determines respective operation times for the at least one of the second home appliances; and
- stops the at least one of the second home appliances when the operation times elapse.

13. The system of claim 12, wherein at least one of the user terminal or the first home appliance outputs the respective operation times.

14. The system according to claim 8, wherein the total power consumption is a total average power consumption of the home appliances in operation.

15. The system according to claim 8, wherein the total power consumption is a total maximum power consumption of the home appliances in operation.

16. The system of claim 8, wherein the user terminal displays images of the home appliances on portions of a screen corresponding to locations where the plurality of home appliances are positioned.

17. The system of claim 16, wherein the user terminal transmits the control command for the operation of the first home appliance to the computer based on receiving an input associated with an image of the first home appliance.

18. A home appliance comprising:
- an output device;
- a communication interface to communicate with a computer; and
- a controller configured to:
  - operate the home appliance based on receiving an indication from the computer that a total power consumption expected during concurrent operation of the home appliance and at least one other home appliance at a location of the home appliance does not exceed a preset reference value,
  - wherein the home appliance does not operate when the total power consumption exceeds the preset reference value.

19. The home appliance of claim 18, wherein the home appliance operates when the at least one other home appliance is not in operation.

20. The home appliance of claim 18, wherein the output device outputs a notification when the first home appliance is not operated based on the total power consumption exceeding the preset reference value.

* * * * *

UNITED STATES PATENT AND TRADEMARK OFFICE
CERTIFICATE OF CORRECTION

| | | |
|---|---|---|
| PATENT NO. | : 12,231,258 B2 | Page 1 of 1 |
| APPLICATION NO. | : 18/088225 | |
| DATED | : February 18, 2025 | |
| INVENTOR(S) | : Jihye Lee, Hyokune Hwang and Jung Eun Chol | |

It is certified that error appears in the above-identified patent and that said Letters Patent is hereby corrected as shown below:

On the Title Page

Item (30) should read:
(30) Foreign Application Priority Data
Jan. 6, 2022 (KR) ............................. 10-2022-0002278
Nov. 1, 2022 (WO) ............................ PCT/KR2022/016862

Signed and Sealed this
Twentieth Day of May, 2025

Coke Morgan Stewart
*Acting Director of the United States Patent and Trademark Office*